Figure 1:
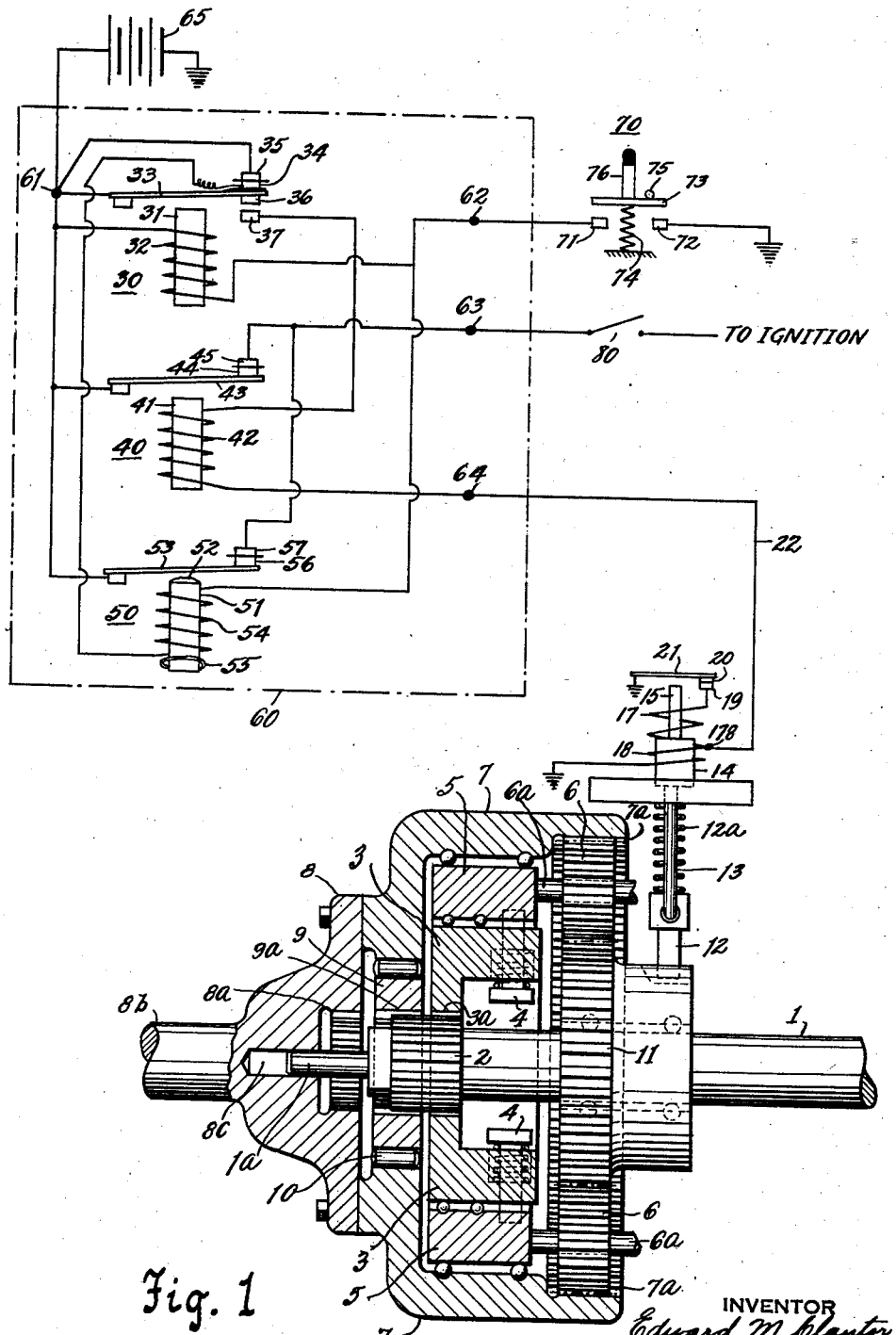

Sept. 15, 1942.    E. M. CLAYTOR    2,295,715
OVERDRIVE CONTROL SYSTEM
Filed Dec. 9, 1940

INVENTOR
Edward M. Claytor
BY
Spencer Hardman & Fehr
his ATTORNEYs

Patented Sept. 15, 1942

2,295,715

UNITED STATES PATENT OFFICE 2,295,715

OVERDRIVE CONTROL SYSTEM

Edward M. Claytor, Anderson, Ind., assignor to General Motors Corporation, Detroit, Mich., a corporation of Delaware Application December 9, 1940, Serial No. 369,247

10 Claims. (Cl. 192—3)

This invention relates to the control of overdrive for automobiles and more particularly to the type of overdrive which includes speed responsive mechanical means in the overdrive for connecting the shaft driven by the engine with a member which carries the planet gears which mesh with a sun gear and also with an internal gear connected with the propeller shaft of the automobile. This type of overdrive is disclosed in my application S. N. 241,917, filed November 23, 1938, now Patent No. 2,241,631, issued May 13, 1941. This application discloses a sun gear locking pawl which is urged by a spring normally into engagement with the sun gear. Therefore the function of going into overdrive is responsive to the operation of centrifugal means for connecting the power shaft with the planet gear carrier. The function of coming out of overdrive is dependent upon the energization of an electromagnet or solenoid for retracting the locking pawl against the action of its speed. In my Patent No. 2,241,631 I provide a system of control operated by a switch controlled by the driver. When this switch is closed the solenoid is energized and the engine ignition is interrupted by disconnecting the ignition apparatus from the current source. The interruption of the ignition facilitates retraction of the sun gear locking pawl by the solenoid. The ignition is restored in response to the retraction of the pawl from engagement with the sun gear. If the solenoid should fail to retract the pawl, the ignition will not be automatically restored. However ignition will be restored when the driver opens the control switch; but, obviously the solenoid will be deenergized and the driver must make another attempt to come out of overdrive by reclosing the switch. The control switch is one which is preferably operated by depression of the throttle pedal to the extent required for quick acceleration. The restoration of the ignition, if it is not restored by withdrawal of the pawl from the sun gear, requires that the driver remember to release the accelerator pedal in order that this switch may open.

It is an object of the present invention to provide for automatically restoring the ignition in any event, regardless of failure of the pawl to be retracted from the sun gear. In other words, if the apparatus fails to come out of overdrive, the driver does not need to remember to release the accelerator pedal in order to restore the ignition. To accomplish this object I provide means which operates in response to the closing of the control switch automatically to withhold ignition for a predetermined period ordinarily sufficient for coming out of overdrive and then automatically to restore the ignition in any event.

Further objects and advantages of the present invention will be apparent from the following description, reference being had to the accompanying drawing wherein a preferred embodiment of the present invention is clearly shown.

In the drawing:

The single figure is a view partly diagrammatic, partly structural showing a form of overdrive mechanism equipped with the electrical control apparatus which constitutes an embodiment of the invention.

Referring to the figure, numeral 1 indicates the driving shaft of the overdrive mechanism. The shaft 1 receives its power from the change speed gear mechanism housed in a box which would be located between the overdrive mechanism and the engine clutch. The shaft 1 is provided with external splines 2 which mesh with internal splines 3a of the ring 3 and with internal splines 9a of the driving member of an overrunning clutch 9. The external splines 2 mesh also with internal splines 8a of a coupling member 8 to which the propeller shaft 8b may be attached. The splines 2 connect together the members 3 and 9 as shown in the figure, when it is desired to use the overdrive mechanism. When it is not intended that the overdrive mechanism shall be used for any considerable period of time, the overdrive may be entirely disconnected by moving the shaft 1 endwise toward the left so that its external splines 2 will engage the internal splines 8a of the member 8, thus connecting together the members 8 and 9 and leaving the member 3 free. The shaft 1 is supported for axial movement at both ends. The support for the right hand end of the shaft 1 is not shown. At the left end of the shaft 1 it is provided with a reduced portion 1a having a sliding fit within an axially aligned recess 8c provided in the member 8.

The member 3 is connectible with the member 5 by means of a speed responsive latch 4. Member 5 is the planet gear ring supporting one or more planet gears 6. The planet gears 6, which are mounted upon rods 6a extending from the ring 5, mesh with sun gear 11 and with an internal gear 7a supported by a frame 7 which cooperates with the clutch rollers 10 which in turn cooperate with the driving clutch cam 9 to receive transmission of torque from the driving member at such times as the driving member 9 tends to rotate ahead of the member 7. However, when the hub of the sun gear 11 is engaged by a sun gear pawl 12 which drops into a notch 11a of the hub of the sun gear, then the external gear 7a and hence its frame 7 are driven at a speed exceeding the speed of the clutch driving member 9. Under these conditions the member 7 will overrun the clutch driving member 9.

The sun gear pawl 12 is urged downwardly into latching position by a spring 12a confined between the head of the pawl 12 and the base 16 of a pawl operating solenoid. The solenoid which lifts the sun gear pawl 12 comprises a solenoid armature 14 connected with the pawl 12 by a rod 13. The solenoid includes two magnet coils 17 and 18 which are connected together at the point 178. Coil 18 is grounded, and coil 17 is connected with the stationary contact 19 engageable by a movable contact 20 and fixed to the end of a leaf spring blade 21 which is grounded. To the solenoid armature 14 there is fixed a rod 15 which engages the blade 21 to separate the contact 20 from the contact 19 when the solenoid armature 14 is attracted upwardly to retract the pawl 12 from the notch 11a in the sun gear hub. The terminal 178 which is common to the solenoid magnet coils 17 and 18 is connected by wire 22 with a source of current through a relay mechanism to be described later. The coils 17 and 18 act cumulatively to effect the attraction of the armature 14 upwardly to withdraw the latch 12 from the sun gear. Since the amount of magnetic flux required to maintain the solenoid 14 in attracted position is much less than that required to withdraw the pawl 12 from the sun gear, the magnet coil 17 is disabled by the opening of contacts 20 and 19 which is effected by the engagement of the rod 15 with the spring blade 21.

The pawl solenoid and the engine ignition are controlled by an assemblage of relays which will now be described. The relay assembly comprises relays 30, 40 and 50 mounted on a common base represented by the rectangle 60 in dot-dash lines. The base 60 carries terminals 61, 62, 63 and 64. Terminal 61 is connected with a battery 65 which is grounded. Terminal 62 is connected with a control switch 70 comprising stationary contacts 71 and 72 and a movable contact 73 urged away from the stationary contact by a spring 74 and against a stop 75. A switch part 76 for closing the switch is located in the path of movement of the accelerator pedal so that this switch may be closed when the accelerator pedal is moved to substantially wide open throttle position. Terminal 63 is connected with the engine ignition apparatus through a manually operated switch 80 locked open by a key controlled lock. Terminal 64 is connected with the wire 22 leading to the pawl solenoid.

Relay 30 comprises a core 31 surrounded by coil 32 connected with terminals 61 and 62, and an armature 33 insulatingly supporting a contact 34 normally engaging a stationary contact 35 and directly carrying a contact 36 normally separated from a stationary contact 37. Contact 35 and armature 33 are connected with terminal 61.

Relay 40 comprises a core 41 surrounded by a magnet coil 42 connected between contact 37 of relay 30 and the terminal 30 and the terminal 64. The armature 43 of relay 40, which is connected with terminal 61, carries a contact 44 for normally engaging a stationary contact 45 connected with terminal 63.

Relay 50 is a time delay relay and comprises a core 51 having a pole face 52 plated with a layer of non-magnetizable metal preferably chromium. Against this chromium plated pole face 52 the armature 53 seals when attracted toward the core 51. Core 51 is surrounded by a magnet coil 54 connected between contact 34 of relay 30 and terminal 62. Core 51 is surrounded by single turn short circuited coil 55 which retards the decay of flux in the relay when its coil 54 is disconnected from the current source. Armature 53 is connected with terminal 61 and carries a contact 56 normally engaging a contact 57 connected with contact 45 of relay 40 and with terminal 63.

The transmission goes into overdrive automatically in response to the attainment of a certain vehicle speed. As a predetermined speed elements 4 of the overdrive cause the shaft 1 to be connected with the planet gear carrier 5. The sun gear 11 is normally held stationary through the action of spring 12a upon pawl 12. When the driver wishes to take the transmission out of overdrive he depresses the accelerator pedal to substantially wide open throttle position thereby causing switch 70 to close. When switch 70 closes, coil 32 of relay 30 and coil 54 of relay 50 are connected with the battery. The armature 53 of relay 50 is attracted downwardly so that it seals against the pole face 52. Contacts 56 and 57 are then separated but ignition is still supplied through contacts 44 and 45 of relay 40 which have not then opened. Armature 33 of relay 30 is attracted downwardly to connect contacts 36 and 37 which causes the battery 65 to be connected with the coil 42 of relay 40 and with the solenoid magnet coils 17 and 18. The armature 43 of relay 40 is attracted downwardly to separate contacts 43 and 45 thereby disconnecting the engine ignition from the battery. Although, at the time contacts 44 and 45 are separated, the contacts 34 and 35 of relay 30 are separated and the coil 54 of relay 50 is disconnected from the battery, the contact 56 is held apart from the contact 57 due to the fact that the armature 53 had sealed on the core face 52 and the decay of flux in the core 51 is retarded by the short circuited coil 50. Therefore the engine ignition is interrupted in order to facilitate the retraction of the pawl 12 from the sun gear 11 due to the pull exerted by the pawl solenoid.

The upward movement of the pawl 12 is accompanied by a movement of rod 15 which engages switch blade 21 to separate contact 20 from contact 19. This causes a main attracting coil 17 to be disconnected, while maintaining the holding coil 18 in operation to retain the solenoid armature 14 in upper position. The pawl 12 is withdrawn from the sun gear by action of coils 17 and 18; and is held retracted by coil 18 alone. When contact 20 is separated from contact 19 the amount of current flowing through the coil 42 of relay 40 is reduced to such low value that the armature 43 of relay 40 is not held down; and the contacts 44 and 45 reengage in order to reconnect the battery with the engine ignition apparatus and thus restore the operation of the engine after coming out of overdrive.

If, for any reason, the pawl 12 should fail to come out of overdrive when the solenoid is energized, the engine ignition will ultimately be restored automatically even though the driver should fail to release the accelerator pedal to permit the switch 70 to open. This restoration of the ignition in any event at a predetermined time following the closing of switch 70 is effected by the time relay 50 which releases contacts 56 and 57 at a predetermined time interval following the separation of contacts 34 and 35 by relay 30. This time delay may be on the order of 0.1 to 0.3 second depending on the construction of relay 50.

From the foregoing description of the construction and mode of operation of the control circuit, it is apparent that I have provided for all of the advantages of the control system of my application Ser. No. 241,917 and have also overcome a possible disadvantage since I have provided for the automatic restoration of engine ignition regardless of failure to come out of overdrive.

While the embodiment of the present invention as herein disclosed, constitutes a preferred form, it is to be understood that other forms might be adopted, all coming within the scope of the claims which follow.

What is claimed is as follows:

1. A control system for overdrives of the type employing mechanical speed responsive means for going into overdrive and having a sun-gear normally locked by a spring urged pawl, said system comprising a solenoid for retracting the pawl when it is desired to come out of overdrive, a current source, a driver controlled switch for controlling energization of the solenoid, means responsive to closure of said switch for discontinuing engine ignition, means for restoring ignition in response to retraction of the sun-gear locking pawl, and means for automatically restoring ignition a predetermined time after closure of said switch independently of the status of the pawl.

2. A control system for overdrives of the type employing mechanical speed responsive means for going into overdrive and having a sun-gear normally locked by a spring urged pawl, said system comprising a solenoid for retracting the pawl when it is desired to come out of overdrive, a current source, a driver controlled switch for controlling energization of the solenoid, a main control relay and time lag relay having magnet coils which are connnected with the current source by the closure of said switch, normally open contacts provided by the main relay for connecting the source and solenoid, normally closed contacts provided by the time lag relay for connecting the source and engine ignition and normally closed contacts connecting the coil of the time lag relay with the source and opened when the magnet coil of the main control relay is energized.

3. A control system for overdrives of the type employing mechanical speed responsive means for going into overdrive and having a sun-gear normally locked by a spring urged pawl, said system comprising a solenoid for retracting the pawl when it is desired to come out of overdrive, a current source, a driver controlled switch for controlling energization of the solenoid, a main control relay and time lag relay having magnet coils which are connected with the current source by the closure of said switch, normally open contacts provided by the main relay for connecting the source and solenoid, normally closed contacts provided by the time lag relay for connecting the source and engine ignition and normally closed contacts provided by the main relay for connecting the coil of the time lag relay with the source and opened when the magnet coil of the main control relay is energized and a third relay having normally closed contacts for connecting the source and engine ignition and having a magnet coil which is energized concurrently with the solenoid, and means responsive to the retraction of the sun-gear locking pawl for reducing current flow in the magnet coil of the third relay to a value such that the contacts of the third relay will reclose and reestablish the ignition.

4. A control system for overdrives of the type employing mechanical speed responsive means for going into overdrive and having a sun-gear normally locked by a spring urged pawl, said system comprising a solenoid for retracting the pawl when it is desired to come out of overdrive, a current source, a driver controlled switch for controlling energization of the solenoid, a main control relay and time lag relay having magnet coils which are connected with the current source by the closure of said switch, normally open contacts provided by the main relay for connecting the source and solenoid, normally closed contacts provided by the time lag relay for connecting the source and engine ignition and normally closed contacts provided by the main relay for connecting the coil of the time lag relay with the source and opened when the magnet coil of the main control relay is energized, means for connecting the source and ignition independently of the time lag relay and operable to open the ignition circuit when the solenoid is energized, and means responsive to retraction of the sun gear locking pawl for rendering said previously named means ineffective to open the ignition circuit.

5. A control system for overdrives of the type employing mechanical speed responsive means for going into overdrive and having a sun-gear normally locked by a spring urged pawl, said system comprising a solenoid for retracting the pawl when it is desired to come out of overdrive, a current source, a driver controlled switch for controlling energization of the solenoid, a main control relay and time lag relay having magnet coils which are connected with the current source by the closure of said switch, normally open contacts provided by the main relay for connecting the source and solenoid, normally closed contacts provided by the time lag relay for connecting the source and engine ignition and normally closed contacts connecting the coil of the time lag relay with the source and opened when the magnet coil of the main control relay is energized, and a third relay having normally closed contacts for connecting the source and engine ignition and having a magnet coil in series with the solenoid, and means responsive to retraction of the sun-gear locking pawl for reducing current flow in the solenoid and in the magnet coil of the third relay, whereby the third relay reestablishes the ignition.

6. A system according to claim 5 in which the solenoid has a main armature-attracting coil and an armature-holding coil in parallel, and in which the armature attracting coil is open circuited in response to retraction of the sun-gear locking pawl, thereby limiting the current flow to that which can flow through the armature holding coil.

7. A system of electrical control of automobile overdrives comprising the combination with an overdrive mechanism having a sun gear and a pawl for restraining movement of the sun gear, of a pawl operating electromagnet, a current source, a switch for connecting the windings of the pawl magnet with the current source, a normally closed, magnet opened relay switch for connecting the current source with the automobile engine ignition, said relay switch having a magnet coil in series with the current source and pawl magnet windings for the purpose of opening the ignition circuit when the pawl magnet operates to retract the pawl from the sun gear, and means responsive to the retractive movement of the pawl for decreasing the amount of current flowing through the relay switch magnet coil whereby the relay switch recloses the ignition circuit after the pawl has been retracted from the sun gear and means operating independently of the pawl for restoring the ignition automatically after the lapse of a predetermined time interval following the closure of said first named switch.

8. A system of electrical control of automobile overdrives comprising the combination with an overdrive mechanism having a sun gear and pawl for restraining movement of the sun gear, of a pawl operating electromagnet, a current source, a switch for connecting the winding of the pawl magnet with the current source, engine ignition apparatus operated by current from the current source, means responsive to operation of said switch for disconnecting the current source from the ignition apparatus, and means responsive to retraction of the pawl for rendering ineffective the means which disconnects the current source from the ignition apparatus and means operating independently of the pawl for restoring the ignition automatically after the lapse of a predetermined time interval following the closure of said switch.

9. A system of electrical control of automobile overdrives comprising the combination with an overdrive mechanism having a sun gear and a pawl for restraining movement of the sun gear, of a pawl operating electromagnet, a current source, a switch for connecting the winding of the pawl magnet with the current source, engine ignition apparatus operated by current from the current source, a relay switch rendered operative in response to operation of the first named switch for disconnecting the current source from the ignition apparatus, and means responsive to retraction of the pawl for reducing the current in the magnet coil of the relay switch in order to render said relay switch ineffective to disconnect the current source from the ignition apparatus and means operating independently of the pawl for restoring the ignition automatically after the lapse of a predetermined time interval following the closure of said first named switch.

10. A system of electrical control of automobile overdrives comprising the combination with an overdrive mechanism having a sun gear and a pawl for restraining movement of the sun gear, of a pawl operating electromagnet having two coil windings in parallel, one being of low resistance and the other of high resistance, a current source, a switch for connecting the windings of the pawl magnet with the current source, a normally closed, magnet opened relay switch for connecting the current source with the automobile engine ignition, said relay switch having a magnet coil in series with the current source and pawl magnet windings for the purpose of opening the ignition circuit when the pawl magnet operates to retract the pawl from the sun gear, and means responsive to the retractive movement of the pawl for causing the low resistance winding of the pawl magnet to be open-circuited thereby increasing the resistance of the circuit of the relay switch magnet coil and thereby decreasing the amount of current flowing through the relay switch magnet coil whereby the relay switch recloses the ignition circuit after the pawl has been retracted from the sun gear and means operating independently of the pawl for restoring the ignition automatically after the lapse of a predetermined time interval following the closure of said first named switch.

EDWARD M. CLAYTOR.